(12) United States Patent
Jiang et al.

(10) Patent No.: US 12,155,051 B2
(45) Date of Patent: Nov. 26, 2024

(54) BATTERY BOX

(71) Applicant: CONTEMPORARY AMPEREX TECHNOLOGY (HONG KONG) LIMITED, Hong Kong (CN)

(72) Inventors: Liwen Jiang, Ningde (CN); Wumei Fang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 633 days.

(21) Appl. No.: 17/355,682

(22) Filed: Jun. 23, 2021

(65) Prior Publication Data

US 2021/0320349 A1    Oct. 14, 2021

Related U.S. Application Data

(63) Continuation of application No. PCT/CN2019/079678, filed on Mar. 26, 2019.

(30) Foreign Application Priority Data

Dec. 27, 2018   (CN) .......................... 201822224306.1

(51) Int. Cl.
 *H01M 10/6556* (2014.01)
 *H01M 10/6568* (2014.01)
 (Continued)

(52) U.S. Cl.
 CPC ... *H01M 10/6556* (2015.04); *H01M 10/6568* (2015.04); *H01M 50/204* (2021.01); *H01M 50/244* (2021.01)

(58) Field of Classification Search
None
See application file for complete search history.

(56) References Cited

U.S. PATENT DOCUMENTS

2013/0164576 A1\*  6/2013  Cha .................. H01M 10/6554
                                                                  429/72
2014/0315064 A1   10/2014  Katayama et al.
(Continued)

FOREIGN PATENT DOCUMENTS

CN        106935756 A  *  7/2017
CN        207409534 U     5/2018
(Continued)

OTHER PUBLICATIONS

CN-106935756-A English machine translation (Year: 2017).*
International Search Report dated Sep. 4, 2019 issued in PCT/CN2019/079678.

*Primary Examiner* — Scott J. Chmielecki
(74) *Attorney, Agent, or Firm* — Scully, Scott, Murphy & Presser, P.C.

(57) ABSTRACT

The present application provides a battery box, including a lower box body. The lower box body includes: a first plate including a bottom wall and a peripheral wall that is connected to the peripheral edge of the bottom wall and extending upwards, where the bottom wall and the peripheral wall together form an accommodating space that opens upwards along a height direction; and a second plate that is fastened under the bottom wall and that forms, together with the bottom wall, an inlet flow path, an outlet flow path, and a main flow path communicating with both the inlet flow path and the outlet flow path, where the main flow path includes a first main flow path, a second main flow path, and a plurality of parallel branch flow paths that communicate with both the first main flow path and the second main flow path.

9 Claims, 4 Drawing Sheets

(51) Int. Cl.
    *H01M 50/204*     (2021.01)
    *H01M 50/244*     (2021.01)

(56)           References Cited

U.S. PATENT DOCUMENTS

| | | |
|---|---|---|
| 2016/0204486 A1 | 7/2016 | Kenney et al. |
| 2017/0122679 A1 | 5/2017 | Kenney et al. |
| 2017/0244142 A1* | 8/2017 | Yao .................. B60L 50/66 |
| 2018/0287227 A1* | 10/2018 | Jeong ................ B60L 58/25 |
| 2018/0294452 A1* | 10/2018 | Tan .................. H01M 10/613 |
| 2018/0337374 A1* | 11/2018 | Matecki ................ B60K 1/04 |
| 2019/0058227 A1* | 2/2019 | Thomas .............. H01M 50/147 |
| 2019/0109357 A1* | 4/2019 | Kenney ................ F28F 21/00 |
| 2019/0207280 A1 | 7/2019 | Kenney et al. |
| 2019/0234695 A1 | 8/2019 | Vucenic et al. |
| 2020/0161616 A1 | 5/2020 | Wang et al. |
| 2020/0220128 A1* | 7/2020 | Kim .................. H01M 10/625 |
| 2021/0091354 A1 | 3/2021 | Wang et al. |
| 2021/0138886 A1* | 5/2021 | Spielvogel ................ F28F 3/12 |
| 2021/0320357 A1 | 10/2021 | Wang et al. |
| 2022/0311085 A1* | 9/2022 | Li .................. H01M 50/3425 |
| 2022/0320673 A1* | 10/2022 | Yang .................. H01M 50/317 |

FOREIGN PATENT DOCUMENTS

| | | |
|---|---|---|
| CN | 208078065 U | 11/2018 |
| EP | 3654405 A1 | 5/2020 |
| WO | 2019144212 A1 | 8/2019 |

* cited by examiner

BATTERY BOX

CROSS-REFERENCE TO RELATED APPLICATIONS

This application is a continuation of International Application No. PCT/CN2019/079678, filed on Mar. 26, 2019, which claims priority to Chinese Patent Application No. 201822224306.1, filed on Dec. 27, 2018. The disclosures of the aforementioned applications are hereby incorporated by reference in their entireties.

TECHNICAL FIELD

The present application relates to the battery field, and in particular, to a battery box.

BACKGROUND

Heat exchange systems of current traction batteries are mostly air heat exchange and water heat exchange systems. However, traditional water heat exchange systems are mostly designed with harmonica tubes, and heat exchange tubes are provided inside at the bottom of a lower box body (that is, a lower surface of a battery module). The heat exchange tubes are designed according to an arrangement and a quantity of modules. Shortcomings of this heat exchange method are as follows: First, the heat exchange tubes and the box body are separate parts, and therefore have a heavy overall weight. Second, liquid leakage of the heat exchange tubes provided inside the box body seriously threatens safety of an entire battery box. Third, maintenance of the heat exchange tubes is cumbersome and requires disassembling of the entire battery box, which is less operable. In addition, the heat exchange tubes are mostly S-shaped or U-shaped whose heat exchange media have a good heat exchange effect in a front section, but have a much worse heat exchange effect in the back section after progressively absorbing a specific amount of heat, resulting in non-uniform and inconsistent temperatures of the battery box.

SUMMARY

In view of the problems in Background, one objective of the present application is intended to provide a battery box in which a heat exchange system can be integrated into a box body, to reduce an overall weight and manufacturing costs.

In view of the problems in Background, another objective of the present application is intended to provide a battery box in which a heat exchange flow path can be placed outside a box body, to eliminate a risk of causing damage to components in the battery box by liquid leakage.

In view of the problems in Background, still another objective of the present application is intended to provide a battery box that can improve a heat exchange effect.

To achieve the foregoing objectives, the present application provides a battery box, including a lower box body. The lower box body includes: a first plate including a bottom wall and a peripheral wall that is connected to the peripheral edge of the bottom wall and extending upwards, where the bottom wall and the peripheral wall together form an accommodating space that opens upwards along a height direction; and a second plate that is fastened under the bottom wall and that forms, together with the bottom wall, an inlet flow path, an outlet flow path, and a main flow path communicating with both the inlet flow path and the outlet flow path, where the main flow path includes a first main flow path, a second main flow path, and a plurality of parallel branch flow paths that communicate with both the first main flow path and the second main flow path.

In an embodiment, the second plate includes a plate body, where the plate body includes: a first concave portion that is recessed downward from a side of the second plate facing toward the first plate; a peripheral portion that is connected to an end portion of the first concave portion and extending outward around the first concave portion; and a plurality of intermediate convex portions spaced apart along a longitudinal direction, where each intermediate convex portion is recessed upward from a side of the first concave portion facing away from the bottom wall and protrudes toward the bottom wall, and each intermediate convex portion is spaced apart from the periphery of the first concave portion along a traverse direction; where the peripheral portion of the plate body and the plurality of intermediate convex portions are each in sealed connection to the bottom wall of the first plate, and the first concave portion is spaced apart from the bottom wall to form the first main flow path, the second main flow path, and the plurality of parallel branch flow paths that communicate with both the first main flow path and the second main flow path.

In an embodiment, the second plate further includes a first lug and a second lug that are connected to one side of the plate body along the longitudinal direction and spaced apart along the traverse direction, where the first lug is provided with a first lug edge portion connected to the peripheral portion of the plate body, and a second concave portion that is recessed downward from the first lug edge portion and communicating with the first concave portion; the second lug is provided with a second lug edge portion connected to the peripheral portion of the plate body, and a third concave portion that is recessed downward from the second lug edge portion and communicating with the first concave portion; and the first lug edge portion of the first lug and the second lug edge portion of the second lug are each in sealed connection to the bottom wall, the second concave portion of the first lug is spaced apart from the bottom wall to form the inlet flow path communicating with the first main flow path, and the third concave portion of the second lug is spaced apart from the bottom wall to form the outlet flow path communicating with the second main flow path.

In an embodiment, the plate body further includes a separation convex portion that is recessed upward from the side of the first concave portion facing away from the bottom wall and that protrudes toward the bottom wall, where the separation convex portion is connected to an intermediate convex portion adjacent to the first lug and the second lug, and extends to the peripheral portion between the first lug and the second lug, and the separation convex portion is in sealed connection to the bottom wall of the first plate to block a branch flow path adjacent to the inlet flow path and the outlet flow path at a position of the separation convex portion.

In an embodiment, the bottom wall of the first plate is further provided with a fourth concave portion that is recessed upward from a side of the bottom wall facing toward the second plate and that protrudes beyond the opposite side, a contour of the fourth concave portion matches an outer contour of the second plate, and the second plate is embedded into the fourth concave portion of the bottom wall.

In an embodiment, the peripheral portion of the plate body of the second plate, the plurality of intermediate convex portions, the separation convex portion, the first lug edge portion of the first lug, and the second lug edge portion of the second lug are each in sealed connection to an inner top surface of the fourth concave portion of the bottom wall, where the first concave portion and the fourth concave portion form the first main flow path, the plurality of parallel branch flow paths, and the second main flow path; the second concave portion of the first lug and the fourth concave portion form the inlet flow path communicating with the first main flow path; and the third concave portion of the second lug and the fourth concave portion form the outlet flow path communicating with the second main flow path.

In an embodiment, the peripheral portion of the plate body of the second plate, the plurality of intermediate convex portions, the separation convex portion, the first lug edge portion of the first lug, and the second lug edge portion of the second lug are each in sealed connection to the fourth concave portion by adhesive.

In an embodiment, the periphery of the second plate is in welded connection to the periphery of the fourth concave portion.

In an embodiment, the second plate is formed by integral stamping.

In an embodiment, the battery box further includes a battery group accommodated in the accommodating space of the first plate, where a lower surface of the battery group is in thermally conductive contact with the bottom wall of the first plate.

Beneficial effects of the present application are as follows: In the battery box of the present application, the first plate and the second plate together form the lower box body and a heat exchange flow path. The box body and the heat exchange flow path are integrated together, thereby reducing an overall weight and manufacturing costs. In addition, the heat exchange flow path is provided externally, thereby effectively avoiding impact of leakage from the heat exchange flow path on components such as batteries inside the battery box, and improving safety of the battery box. Furthermore, the main flow path formed by the first plate and the second plate allows a short heat exchange path and uniform heat exchange, thereby improving a heat exchange effect.

Figure 1:
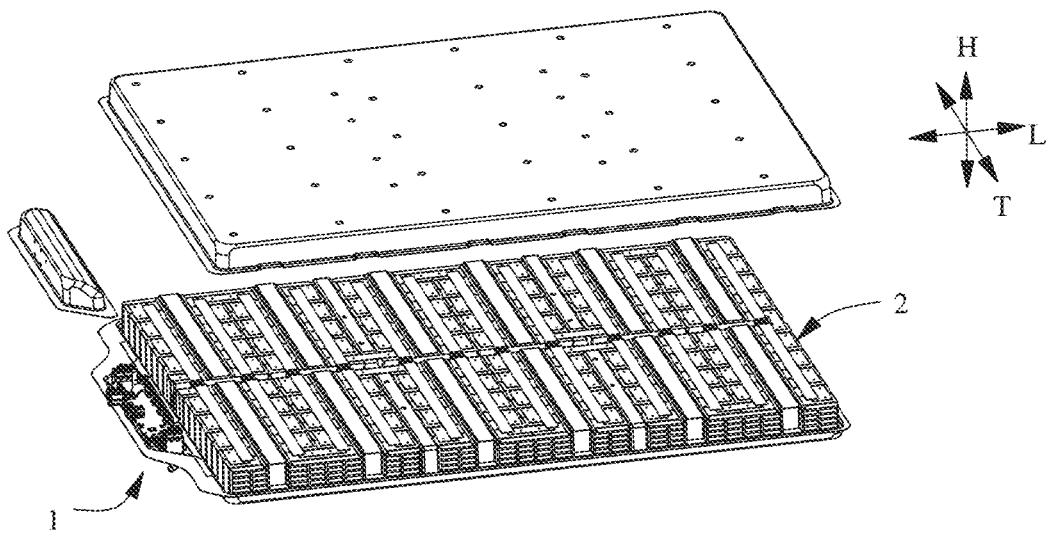
FIG. 1 is a three-dimensional exploded view of a battery box according to the present application.

REFERENCE SIGNS ARE DESCRIBED AS FOLLOWS 1. lower box body
    11. first plate
        111. bottom wall
            111P. protrusion
            111R. fourth concave portion
                S. inner top surface
        112. peripheral wall
        113. flange
        114. accommodating space
    12. second plate
        B. plate body
            B1. peripheral portion
            B2. first concave portion
            B3. intermediate convex portion
                O. opening
            B4. separation convex portion
            E1. first lug
                E11. first lug edge portion
                E12. second concave portion
            E2. second lug
                E21. second lug edge portion
                E22. third concave portion
            F1. inlet flow path
            F2. outlet flow path
            F3. main flow path
                F31. first main flow path
                F32. second main flow path
                F33. branch flow path
2. battery group
3. protection plate
L. longitudinal direction
H. height direction
T. traverse direction

DESCRIPTION OF EMBODIMENTS

The accompanying drawings show embodiments of the present application. It should be understood that the disclosed embodiments are merely examples of the present application and the present application can be implemented in various forms. Therefore, specific details disclosed herein should not be construed as a limitation. Instead, they should serve only as a basis for the claims and as an illustrative basis to instruct persons of ordinary skill in the art to implement the present application in various ways.

Additionally, expressions such as a longitudinal direction, a height direction, and a traverse direction that are used to indicate directions for operations and construction of components of a battery box in the embodiments are not absolute but rather relative. Such indications are appropriate when these components of the battery box are in the locations illustrated in the drawings; however, these directions should be interpreted differently when these locations change, in order to correspond to the changes.

Figure 2:
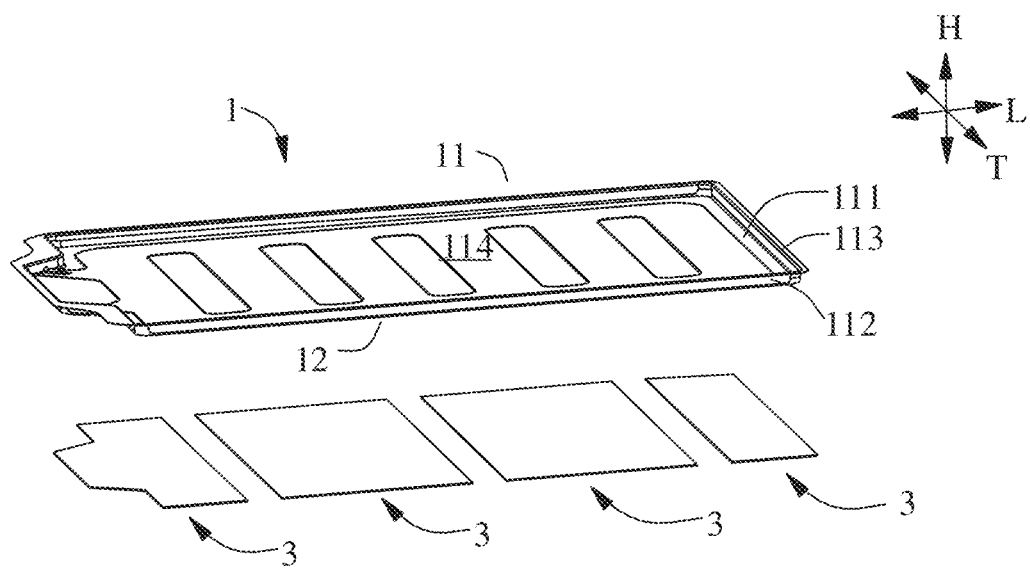
FIG. 2 is a view of some components in FIG. 1.

FIG. 1 is a three-dimensional exploded view of a battery box according to the present application. FIG. 2 is a view of some components in FIG. 1.

The battery box according to the present application includes a lower box body 1, a battery group 2 accommodated in the lower box body 1, and a protection plate 3 provided under the lower box body 1.

Figure 3:
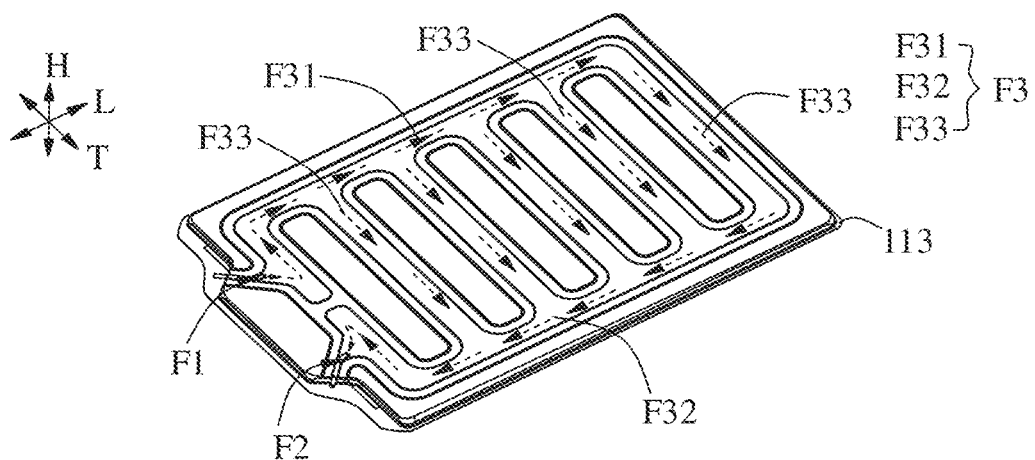
FIG. 3 is a three-dimensional bottom view of a lower box body in FIG. 2.
Figure 4:
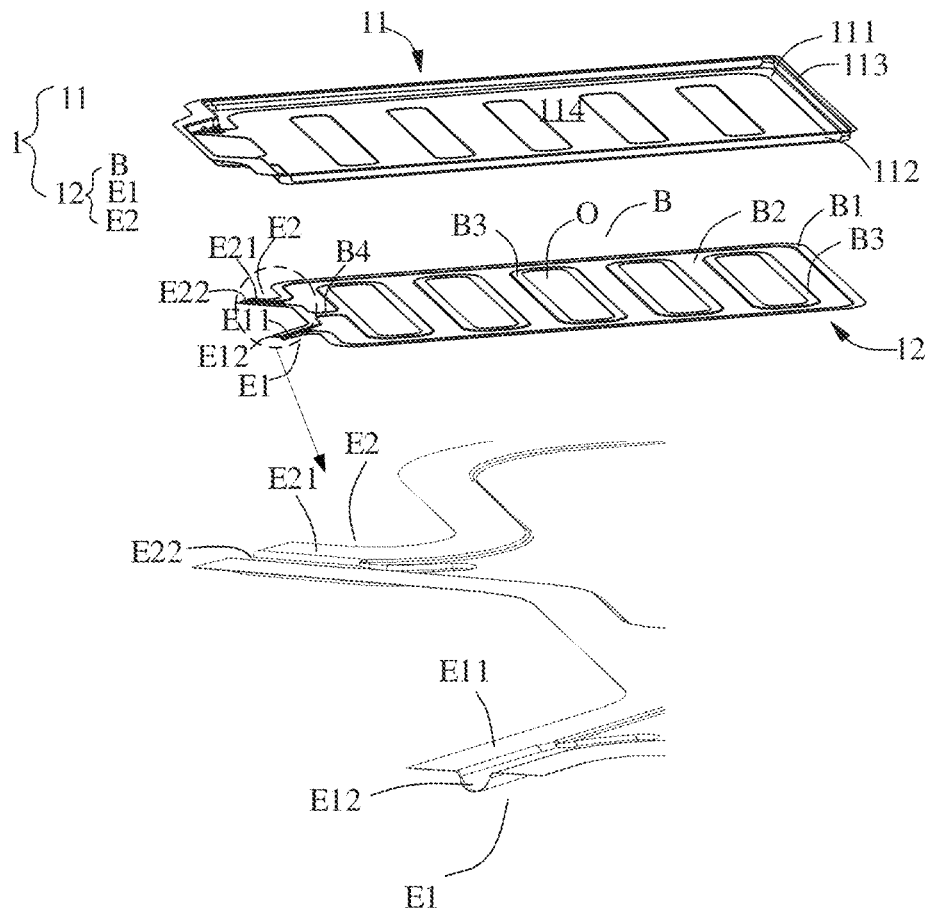
FIG. 4 is an exploded view of FIG. 3.
Figure 5:
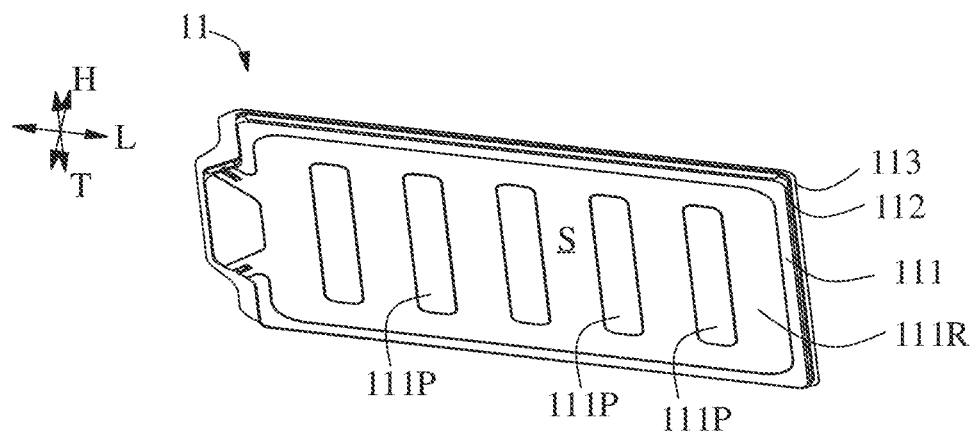
FIG. 5 is a three-dimensional bottom view of a first plate in FIG. 3.

FIG. 3 is a three-dimensional bottom view of a lower box body in FIG. 2. FIG. 4 is an exploded view of FIG. 3. FIG. 5 is a three-dimensional bottom view of a first plate 11 in FIG. 3.

The lower box body 1 includes the first plate 11 and a second plate 12, and the second plate 12 is fastened below the first plate 11.

The first plate 11 includes a bottom wall 111 and a peripheral wall 112 that is connected to the peripheral edge of the bottom wall 111 and extending upwards, where the bottom wall 111 and the peripheral wall 112 together form an accommodating space 114 that opens upwards along a height direction H. The lower box body further includes a flange 113 that is connected to an end portion of the peripheral wall 112 and extending outside the lower box body 1. The bottom wall 111, the peripheral wall 112, and the flange 113 are formed by integrated stamping. A thickness of the first plate 11 is 0.6 mm to 1.2 mm, and preferably, 0.8 mm. The battery group 2 is accommodated in the accommodating space 114 of the first plate 11, where a lower surface of the battery group 2 is in thermally conductive contact with the bottom wall 111 of the first plate 11. The battery group 2 may be in thermally conductive contact with the bottom wall 111 of the first plate 11 by using a thermally conductive pad, thermally conductive glue, or the like, so that a main flow path F3 can heat or cool the battery group 2.

The second plate 12 is fastened under the bottom wall 111 and forms, together with the bottom wall 111, an inlet flow path F1, an outlet flow path F2, and the main flow path F3 communicating with both the inlet flow path F1 and the outlet flow path F2, where the main flow path F3 includes a first main flow path F31, a second main flow path F32, and a plurality of parallel branch flow paths F33 that communicate with both the first main flow path F31 and the second main flow path F32. The bottom wall 111 and the peripheral wall 112 of the first plate 11 together form the accommodating space 114 that opens upward along the height direction H, and the second plate 12 is fastened under the bottom wall 111 to form, together with the bottom wall 111, heat exchange flow paths (the inlet flow path F1, the outlet flow path F2, and the main flow path F3). This implements integration of the lower box body 1 and a heat exchange system, reducing an overall weight of the battery box and manufacturing costs. In addition, the heat exchange flow paths are formed outside the lower box body 1, thereby avoiding impact of liquid leakage from various flow paths on batteries and other components inside the box body, and improving safety of the battery box. Furthermore, the formed main flow path F3 includes the first main flow path F31, the second main flow path F32, and the plurality of parallel branch flow paths F33 that communicate with both the first main flow path F31 and the second main flow path F32. Compared with S-shaped paths in known technologies, this flow path is shorter and therefore improves a heat exchange effect, and temperatures after heat exchange of all branch flow paths F33 tend to be the same, thereby ensuring a uniform and consistent temperature of the battery box.

The protection plate 3 is provided under the second plate 12 to protect the main flow path F3 of the lower box body 1 from below, protect the lower box body 1 against damage caused by the bottom, and prevent heat from spreading to the outside through heat preservation.

The second plate 12 and the bottom wall 111 of the first plate 11 can be combined in a variety of ways to form the inlet flow path F1, the outlet flow path F2, and the main flow path F3 communicating with both the inlet flow path F1 and the outlet flow path F2. Embodiments of different formation manners are described below.

In a first embodiment, as shown in FIG. 2 to FIG. 5, the bottom wall 111 of the first plate 11 is provided with a plurality of protrusions 111P, and the protrusions 111P are recessed downward from a side of the bottom wall 111 facing away from the second plate 12 and protrude toward the second plate 12. The bottom wall 111 of the first plate 11 is further provided with a fourth concave portion 111R that is recessed upward from a side of the bottom wall 111 facing toward the second plate 12 and that protrudes beyond the opposite side, a contour of the fourth concave portion 111R matches an outer contour of the second plate 12, and the second plate 12 is embedded into the fourth concave portion 111R of the bottom wall 111. The embedded connection reduces a connection height of the first plate 11 and the second plate 12 in the height direction H, thereby reducing an overall height of the battery box and increasing energy density of the battery box. The periphery of the second plate 12 is in welded connection to the periphery of the fourth concave portion 111R. With the fourth concave portion 111R, a space for accommodating heat exchange media can be increased, and heat exchange efficiency of the battery box can be improved. In addition, in an assembly process of the first plate 11 and the second plate 12, the fourth concave portion 111R allows the second plate 12 to be accurately mounted in place.

The second plate 12 includes a plate body B. The second plate 12 further includes a first lug E1 and a second lug E2 that are connected to one side of the plate body B along a longitudinal direction L and spaced apart along a traverse direction T. The second plate 12 is formed by integral stamping.

The plate body B includes a first concave portion B2 that is recessed downward from a side of the second plate 12 facing toward the first plate 11; a peripheral portion B1 that is connected to an end portion of the first concave portion B2 and extending outward around the first concave portion B2; and a plurality of intermediate convex portions B3 spaced apart along a longitudinal direction L, where each intermediate convex portion B3 is recessed upward from a side of the first concave portion B2 facing away from the bottom wall 111 and protrudes toward the bottom wall 111, and each intermediate convex portion B3 is spaced apart from the periphery of the first concave portion B2 along a traverse direction T. The plate body B further includes a separation convex portion B4 that is recessed upward from the side of the first concave portion B2 facing away from the bottom wall 111 and that protrudes toward the bottom wall 111. Each intermediate convex portion B3 is provided with a run-through opening O in a vertical direction. Correspondingly, each protrusion 111P corresponds to an opening O of one intermediate convex portion B3 and is inserted into the opening O. The design of the opening O can reduce overall mass of the lower box body 1. The protrusion 111P is inserted into the opening O to fix positions of the first plate 11 and the second plate 12, thereby ensuring that the first plate 11 and the second plate 12 are in correct positions when being connected. In addition, the protrusion 111P can also increase strength of the second plate 12 at the opening O. The periphery of each protrusion 111P is in sealed connection, or preferably in welded connection, to an inner side edge of the opening O.

The first lug E1 is provided with a first lug edge portion E11 connected to the peripheral portion B1 of the plate body B, and a second concave portion E12 that is recessed downward from the first lug edge portion E11 and communicating with the first concave portion B2.

The second lug E2 is provided with a second lug edge portion E21 connected to the peripheral portion B1 of the plate body B, and a third concave portion E22 that is recessed downward from the second lug edge portion E21 and communicating with the first concave portion B2.

The separation convex portion B4 is connected to an intermediate convex portion B3 adjacent to the first lug E1 and the second lug E2, and extends to the peripheral portion B1 between the first lug E1 and the second lug E2, and the separation convex portion B4 is in sealed connection to an inner top surface S of the fourth concave portion 111R of the first plate 11 to block a branch flow path F33 adjacent to the inlet flow path F1 and the outlet flow path F2 at a position of the separation convex portion B4.

The peripheral portion B1 of the plate body B of the second plate 12, the plurality of intermediate convex portions B3, the separation convex portion B4, the first lug edge portion E11 of the first lug E1, and the second lug edge portion E21 of the second lug E2 are each in sealed connection to the inner top surface S of the fourth concave portion 111R of the bottom wall 111, the first concave portion B2 and the fourth concave portion 111R form the first main flow path F31, the plurality of parallel branch flow paths F33, and the second main flow path F32, the second concave portion E12 of the first lug E1 and the fourth concave portion 111R form the inlet flow path F1 communicating with the first main flow path F31, and the third concave portion E22 of the second lug E2 and the fourth concave portion 111R form the outlet flow path F2 communicating with the second main flow path F32.

The heat exchange media flow in through the inlet flow path F1, then flow into the first main flow path F31, then enter the plurality of parallel branch flow paths F33 that communicate with the first main flow path F31, then converge to the second main flow path F32, and then are discharged through the outlet flow path F2. This is a heat exchange path. Most heat exchange paths in known technologies are S-shaped or U-shaped, and therefore when heat exchange media flow from an inlet to the back section of the path, a heat exchange effect in the back section of the heat exchange path is not good because a temperature of the heat exchange media has absorbed heat in the front section of the path, resulting in non-uniform overall temperatures of the battery box. In the flow path of this specification, the heat exchange media only pass through the first main flow path F31 and then directly enter the parallel branch flow paths F33 for heat exchange. Heat exchange paths of the branch flow paths F33 are short, thereby improving the heat exchange effect. Temperatures of the heat exchange media in the branch flow paths F33 tend to be the same, thereby ensuring a uniform heat exchange temperature, and improving temperature consistency of the battery box.

The peripheral portion B1 of the plate body B of the second plate 12, the plurality of intermediate convex portions B3, the separation convex portion B4, the first lug edge portion E11 of the first lug E1, and the second lug edge portion E21 of the second lug E2 are each in sealed connection to the fourth concave portion 111R by adhesive. Certainly, the sealed connection may alternatively be implemented by laser welding, or by applying adhesive followed by laser welding. This can be selected depending on a specific situation, provided that good sealing can be ensured.

Figure 6:
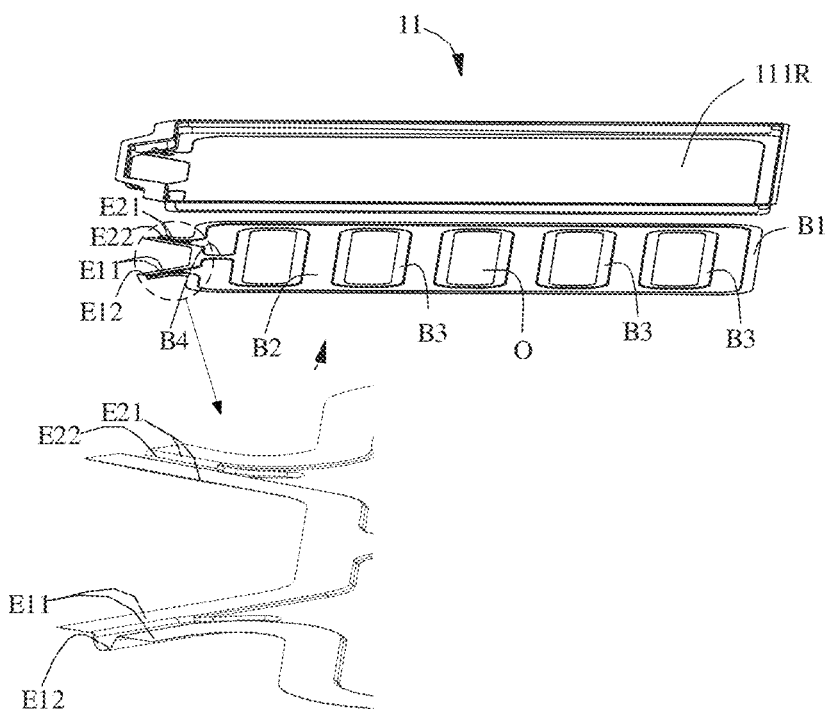
FIG. 6 is an exploded view of another embodiment of a lower box body similar to that in FIG. 4.

FIG. 6 is an exploded view of another embodiment of a lower box body similar to that in FIG. 4.

In a second embodiment shown in FIG. 6, compared with the first embodiment, in the lower box body 1, the bottom wall 111 of the first plate 11 is not provided with the plurality of protrusions 111P, but other structures of the first plate 11 are the same as structures of the first plate 11 in the first embodiment, and the structure of the second plate 12 is the same as the structure of the second plate 12 in the first embodiment. Because the bottom wall 111 is not provided with the plurality of protrusions 111P, and no corresponding protrusions 111P are inserted into the openings O of the second plate 12, when the first plate 11 and the second plate 12 are connected, peripheries of the openings O need to be in sealed connection, and specifically, in welded connection, to the bottom wall 111 of the first plate 11 to prevent a risk of liquid leakage. Other specific structures of the first plate 11 and the second plate 12 and a manner in which the first plate 11 and the second plate 12 are connected to form the inlet flow path F1, the outlet flow path F2, and the main flow path F3 in this embodiment are the same as those in the first embodiment. Descriptions are not repeated herein. Eliminating the design of the plurality of protrusions 111P can increase a contact area between the bottom wall 111 and the battery group 2 and improve heat dissipation efficiency. In addition, the openings O of the second plate 12 may also be eliminated. In this case, the intermediate convex portions B3 may be in sealed connection to the inner top surface S of the fourth concave portion 111R by adhesive or welding.

Figure 7:
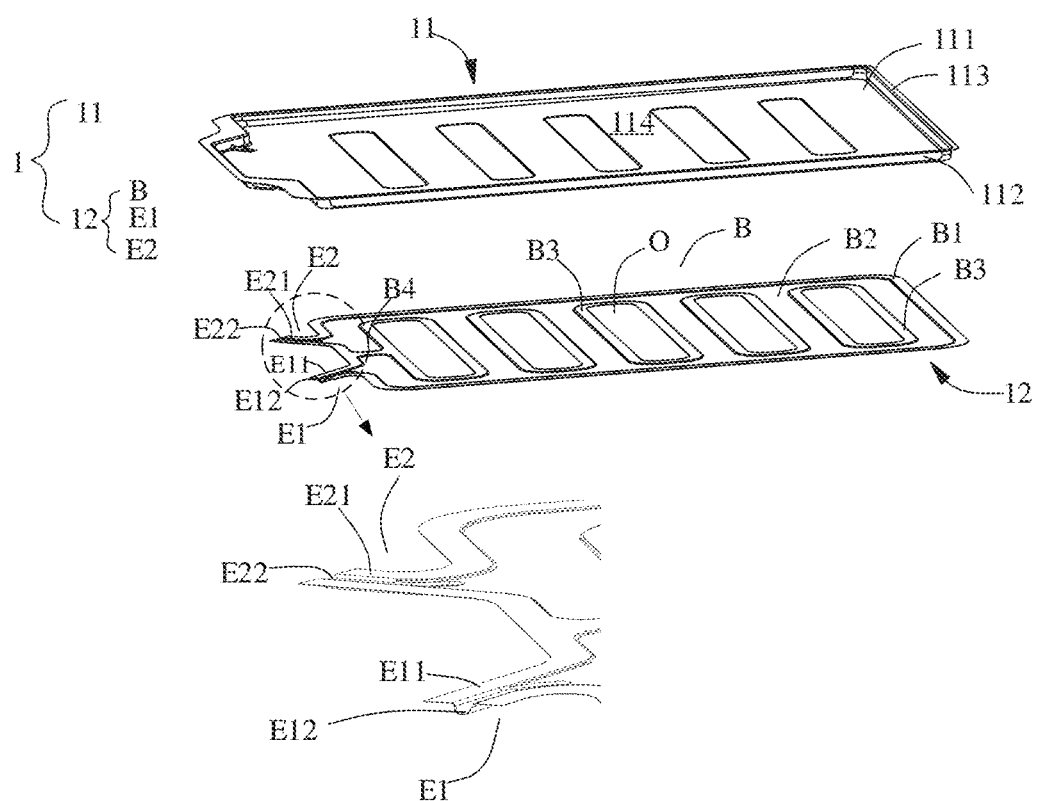
FIG. 7 is an exploded view of still another embodiment of a lower box body similar to that in FIG. 4.

FIG. 7 is an exploded view of still another embodiment of a lower box body similar to that in FIG. 4.

In a third embodiment shown in FIG. 7, compared with the first embodiment, in the lower box body 1, the bottom wall 111 of the first plate 11 is not provided with the fourth concave portion 111R, but other structures are the same as structures of the first plate 11 in the first embodiment, and the structure of the second plate 12 is the same as the structure of the second plate 12 in the first embodiment. Details are not described herein again. In this embodiment, because the bottom wall 111 of the first plate 11 is not provided with the fourth concave portion 111R, the peripheral portion B1 of the plate body B and the plurality of intermediate convex portions B3 are each in sealed connection to the bottom wall 111 of the first plate 11, and the first concave portion B2 is spaced apart from the bottom wall 111 to form the first main flow path F31, the second main flow path F32, and the plurality of parallel branch flow paths F33 that communicate with both the first main flow path F31 and the second main flow path F32; and the separation convex portion B4 is in sealed connection to the bottom wall 111 of the first plate 11 to block a branch flow path F33 adjacent to the inlet flow path F1 and the outlet flow path F2 at a position of the separation convex portion B4. The first lug edge portion E11 of the first lug E1 and the second lug edge portion E21 of the second lug E2 are each in sealed connection to the bottom wall 111, the second concave portion E12 of the first lug E1 is spaced apart from the bottom wall 111 to form the inlet flow path F1 communicating with the first main flow path F31, and the third concave portion E22 of the second lug E2 is spaced apart from the bottom wall 111 to form the outlet flow path F2 communicating with the second main flow path F32. It can be learned that the flow path formed in this embodiment is the same as the flow path in the first embodiment, and achieves a same technical effect as the flow path in the first embodiment in terms of heat exchange, except that the bottom wall 111 is set to be flat to increase a contact area with the battery group 2 and improve the heat dissipation effect. Certainly, in this embodiment, the 111P protrusions of the bottom wall 111 can be eliminated. In such case, the openings O of the second plate 12 can also be adaptively eliminated. This can be selected depending on a specific situation.

The foregoing detailed descriptions describe a plurality of example embodiments. However, an expressly disclosed combination is not limited herein. Therefore, unless otherwise stated, various features disclosed herein may be combined together to form a plurality of other combinations that are not shown for simplicity purposes.

What is claimed is:

1. A battery box, comprising a lower box body, wherein the lower box body comprises:

a first plate comprising a bottom wall and a peripheral wall that is connected to the peripheral edge of the bottom wall and extending upwards, wherein the bottom wall and the peripheral wall together form an accommodating space that opens upwards along a height direction; and a second plate that is fastened under the bottom wall and that is connected together with the bottom wall, the second plate comprises a plate body, wherein the plate body comprises:

a first concave portion that is recessed downward from a side of the second plate facing toward the first plate;

a peripheral portion that is connected to an end portion of the first concave portion and extending outward around the first concave portion; and a plurality of intermediate convex portions spaced apart along a longitudinal direction, wherein each intermediate convex portion is recessed upward from a side of the first concave portion facing away from the bottom wall and protrudes toward the bottom wall, and each intermediate convex portion is spaced apart from the periphery of the first concave portion along a traverse direction;

wherein the peripheral portion of the plate body and the plurality of intermediate convex portions are each in sealed connection to the bottom wall of the first plate, and the first concave portion is spaced apart from the bottom wall to form flow paths;

the second plate further comprises a first lug and a second lug that are connected to one side of the plate body along the longitudinal direction and spaced apart along the traverse direction, wherein the first lug is provided with a first lug edge portion connected to the peripheral portion of the plate body, and a second concave portion that is recessed downward from the first lug edge portion and communicating with the first concave portion;

the second lug is provided with a second lug edge portion connected to the peripheral portion of the plate body, and a third concave portion that is recessed downward from the second lug edge portion and communicating with the first concave portion; and the first lug edge portion of the first lug and the second lug edge portion of the second lug are each in sealed connection to the bottom wall, the second concave portion of the first lug is spaced apart from the bottom wall to form the inlet flow path communicating with the first main flow path, and the third concave portion of the second lug is spaced apart from the bottom wall to form the outlet flow path communicating with the second main flow path.

2. The battery box according to claim 1, wherein the plate body further comprises:

a separation convex portion that is recessed upward from the side of the first concave portion facing away from the bottom wall and that protrudes toward the bottom wall, wherein the separation convex portion is connected to an intermediate convex portion adjacent to the first lug and the second lug, and extends to the peripheral portion between the first lug and the second lug, and the separation convex portion is in sealed connection to the bottom wall of the first plate to block a branch flow path adjacent to the inlet flow path and the outlet flow path at a position of the separation convex portion.

3. The battery box according to claim 2, characterized in that wherein the bottom wall of the first plate is further provided with a fourth concave portion that is recessed upward from a side of the bottom wall facing toward the second plate and that protrudes beyond the opposite side, a contour of the fourth concave portion matches an outer contour of the second plate, and the second plate is embedded into the fourth concave portion of the bottom wall.

4. The battery box according to claim 3, wherein the peripheral portion of the plate body of the second plate, the plurality of intermediate convex portions, the separation convex portion, the first lug edge portion of the first lug, and the second lug edge portion of the second lug are each in sealed connection to an inner top surface of the fourth concave portion of the bottom wall, wherein the first concave portion and the fourth concave portion form the first main flow path, the plurality of parallel branch flow paths, and the second main flow path; the second concave portion of the first lug and the fourth concave portion form the inlet flow path communicating with the first main flow path; and the third concave portion of the second lug and the fourth concave portion form the outlet flow path communicating with the second main flow path.

5. The battery box according to claim 3, wherein the peripheral portion of the plate body of the second plate, the plurality of intermediate convex portions, the separation convex portion, the first lug edge portion of the first lug, and the second lug edge portion of the second lug are each in sealed connection to the fourth concave portion by adhesive.

6. The battery box according to claim 3, wherein the periphery of the second plate is in welded connection to the periphery of the fourth concave portion.

7. The battery box according to claim 1, wherein the second plate is formed by integral stamping.

8. The battery box according to claim 1, wherein the battery box further comprises a battery group accommodated in the accommodating space of the first plate, wherein a lower surface of the battery group is in thermally conductive contact with the bottom wall of the first plate.

9. The battery box according to claim 1, wherein the second plate forms, together with the bottom wall, an inlet flow path, an outlet flow path, and a main flow path communicating with both the inlet flow path and the outlet flow path, wherein the main flow path comprises a first main flow path, a second main flow path, and a plurality of parallel branch flow paths that communicate with both the first main flow path and the second main flow path.

* * * * *